United States Patent [19]

Pelletier et al.

[11] Patent Number: 4,540,032
[45] Date of Patent: Sep. 10, 1985

[54] TREE HARVESTING MACHINE

[75] Inventors: Jean Pelletier, St-Felicien; Gilles Filion, Quebec; Clement Potvin, St-Prime, all of Canada

[73] Assignee: Industries Tanguay Inc., St-Prime, Canada

[21] Appl. No.: 640,045

[22] Filed: Aug. 10, 1984

[51] Int. Cl.³ .............................................. A01G 23/08
[52] U.S. Cl. .................... 144/3 D; 144/2 Z; 144/335; 144/336; 414/486
[58] Field of Search ..................... 144/2 Z, 3 D, 34 R, 144/34 E, 335, 336, 338, 340, 343; 414/486, 487, 555

[56] References Cited

U.S. PATENT DOCUMENTS

| | | |
|---|---|---|
| 3,491,810 | 1/1970 | Williams . |
| 3,601,169 | 8/1971 | Hamilton et al. . |
| 3,631,905 | 1/1972 | Karlin . |
| 3,659,635 | 5/1972 | Mellgren . |
| 3,708,000 | 1/1973 | Dufty et al. . |
| 3,720,245 | 3/1973 | Puna ................................... 144/3 D |
| 3,797,541 | 3/1974 | Kurelek et al. . |
| 4,127,152 | 11/1978 | Larson et al. . |
| 4,147,194 | 4/1979 | Johnson . |

FOREIGN PATENT DOCUMENTS

| | | |
|---|---|---|
| 858284 | 12/1970 | Canada . |
| 871532 | 8/1971 | Canada . |
| 604542 | 4/1978 | U.S.S.R. .............................. 144/3 D |
| 679182 | 8/1979 | U.S.S.R. .............................. 144/3 D |
| 688157 | 9/1979 | U.S.S.R. .............................. 144/3 D |

Primary Examiner—W. D. Bray
Attorney, Agent, or Firm—Robic, Robic & Associates

[57] ABSTRACT

A tree harvesting machine is disclosed which is of the type having a wheel-mounted frame, a tree harvesting mechanism at the front and a berth at the rear for accumulated felled trees. An inverted tree grapple is provided forwardly of the berth and is mounted to the berth so that it can be slid to and from the berth whereby the grapple may be held close to the berth during accumulation of felled trees and moved away from the berth when loaded. In this last position, the center of gravity of the load has thus been shifted forwardly. The berth itself is pivoted to the frame to allow loading to take place in rearwardly inclined position. Once loaded, the berth may then be uprighted easily since the center of gravity of the load has shifted forwardly.

9 Claims, 6 Drawing Figures

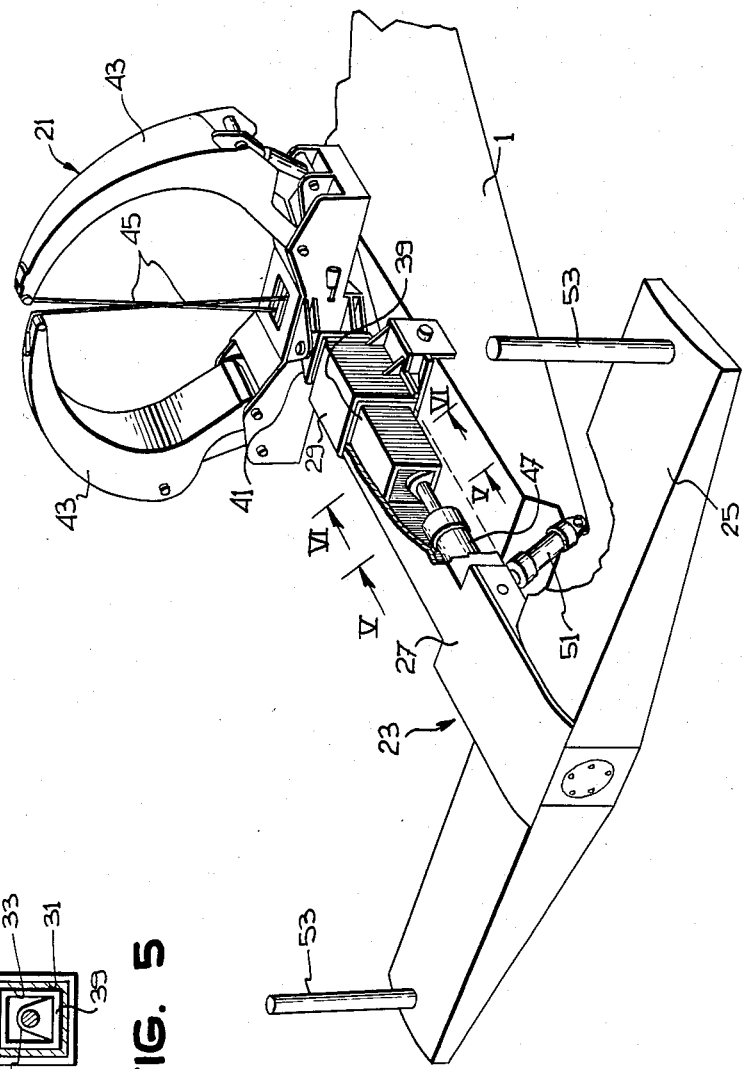
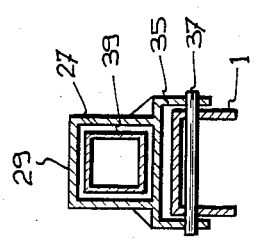
FIG. 5
FIG. 6
FIG. 4

TREE HARVESTING MACHINE

The present invention generally relates to a tree harvesting machine having a wheel-mounted frame, a tree harvesting mechanism at the front and a berth or cradle at the rear into which felled trees are accumulated for transportation.

By harvesting mechanism, as used herein, is to be understood any tree processing means normally found at the front end of such machines for cutting trees and loading them onto the berth or cradle and sometimes including delimbing means. The expression is therefore to be taken in such a broad sense.

As is known, the length of the trees as well as the distance which is required by the harvesting mechanism to properly lay the felled trees into the berth normally necessitate a very long carrying frame as well as a berth structure that extends much beyond the center of gravity of the load.

The main object of the present invention is to provide a harvesting machine of the above type which has a shorter vehicle frame but which nevertheless permits obtaining operating conditions that are just as good if not better than those available with present day long frame harvesting machines.

More specifically, a machine according to the invention has an inverted tree grapple which is slidably displaceable forwardly with respect to the berth. When stacking of the trees is terminated and the grapple is tightly closed around the tree bunch, the grapple can then be moved away from the berth and, in this manner, shift the center of gravity of the load toward the front of the vehicle. Considering that the berth is also pivoted to the frame, loading of the trees can be achieved with the berth tilted rearwardly and, when loading is finished and the load moved forwardly by the grapple as aforesaid, the berth can then easily be tilted in reverse and uprighted, preferably being forwardly inclined, since the center of gravity of the load has been moved forward. The overall advantage of the arrangement according to the invention is that an appreciably shorter vehicle frame is needed than heretofore, also providing more room to the tree handling boom structure for moving the felled trees.

Accordingly, the invention is herein broadly claimed as a tree harvesting machine of the type having a wheel-mounted frame, a tree harvesting mechanism at the front end of said frame and berth means on said frame behind said harvesting mechanism for holding accumulated trees felled by said harvesting mechanism, lengthwise of said frame, the improvement wherein said berth means comprises:

a berth section and means mounting said berth section on said frame for pivotal movement about an axis transverse to said frame;

grapple means forwardly of said berth section, said grapple having a pair of gripping arms movable laterally of said frame and suitable to grip and tightly hold said accumulated felled trees together;

means interconnecting said grapple means and said berth section for slidable displacement of said grapple means with respect to said berth section and lengthwise of said frame between a position wherein said grapple means is close to said berth section and a position wherein said grapple means is away from said berth section, and first power means interconnecting said berth section and said frame and suitable to pivot said berth section and grapple means about said transverse pivot axis.

The description of a preferred embodiment of the invention now follows with reference to the appended drawings wherein:

FIG. 4 is a perspective view of the berth construction;

FIGS. 5 and 6 are partial cross-sectional views taken along lines V—V and VI of FIG. 4, respectively.

Figure 1:
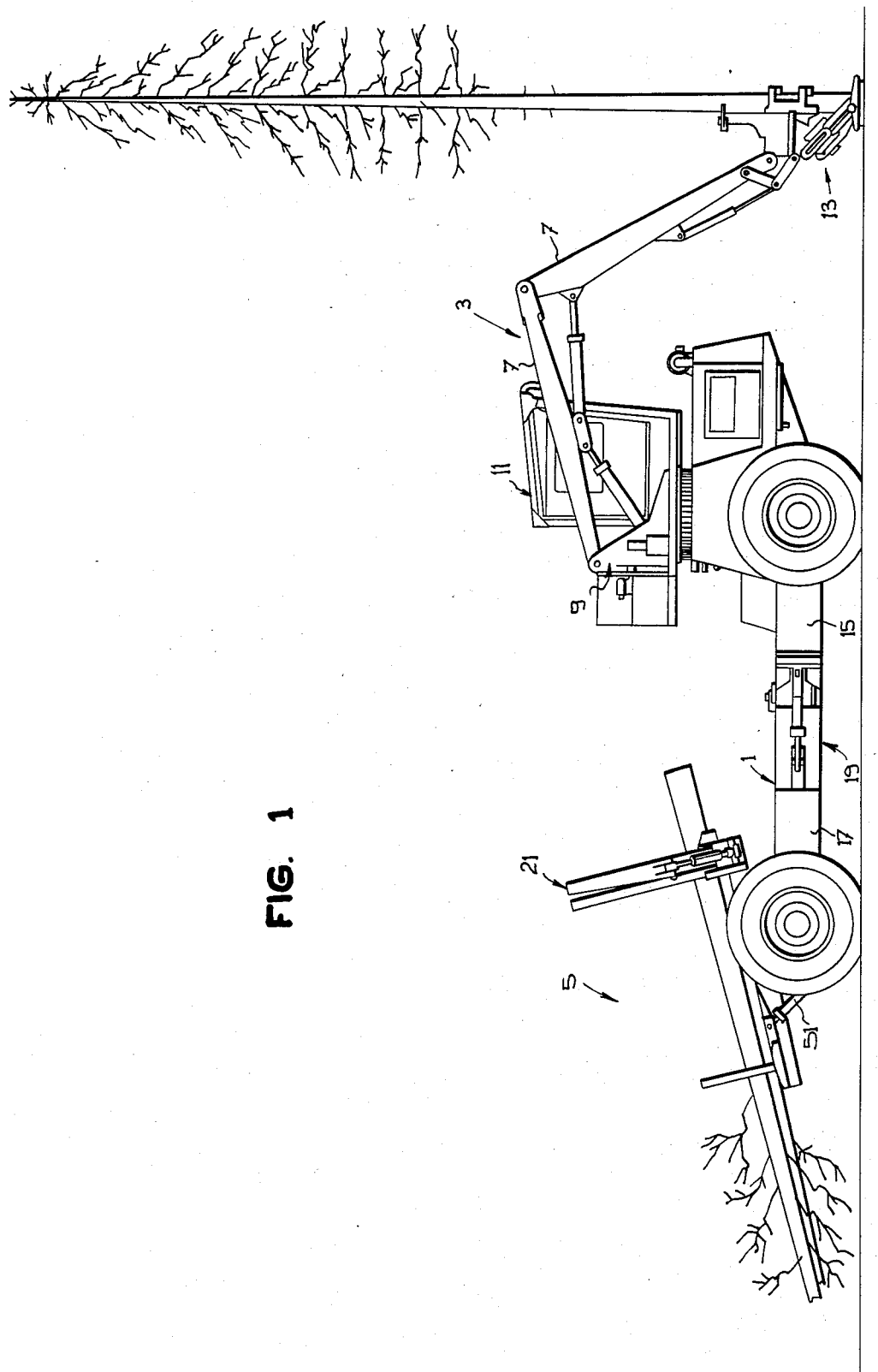
FIGS. 1, 2 and 3 are side elevation views of a harvesting machine incorporating an improved berth construction made according to the invention.

As mentioned above, the berth construction according to the invention is for use on a tree harvesting machine of the general type having a wheel-mounted frame 1, a tree harvesting mechanism 3 at the front end of the frame 1 and a berth means or construction 5 mounted on the frame behind the harvesting mechanism 3. In the usual manner, the berth construction 5 defines a trough or cradle into which trees severed at the base by means of the harvesting mechanism 3 are laid and accumulated lengthwise of the frame 1.

The tree harvesting mechanism 3 comprises, as is known, a broken boom formed of a pair of boom parts 7 articulated to one another with one of the parts pivotally connected to a post 9, behind the cab 11, the post 9 being swingable about a vertical axis. The free end of the other boom part 7 has a tree processing device 13 which may include selectively operable tree gripping means, tree severing means, propelling means and delimbing means some or all of which are found in standard tree processing devices for this type of machines.

The vehicle frame 1 will usually include a forward part 15 to which a rearward part 17 is connected by means of a hydraulically operated pivot mechanism 19 allowing swinging of the berth construction 5 about a vertical axis and with respect to the cab 11.

Figure 2:
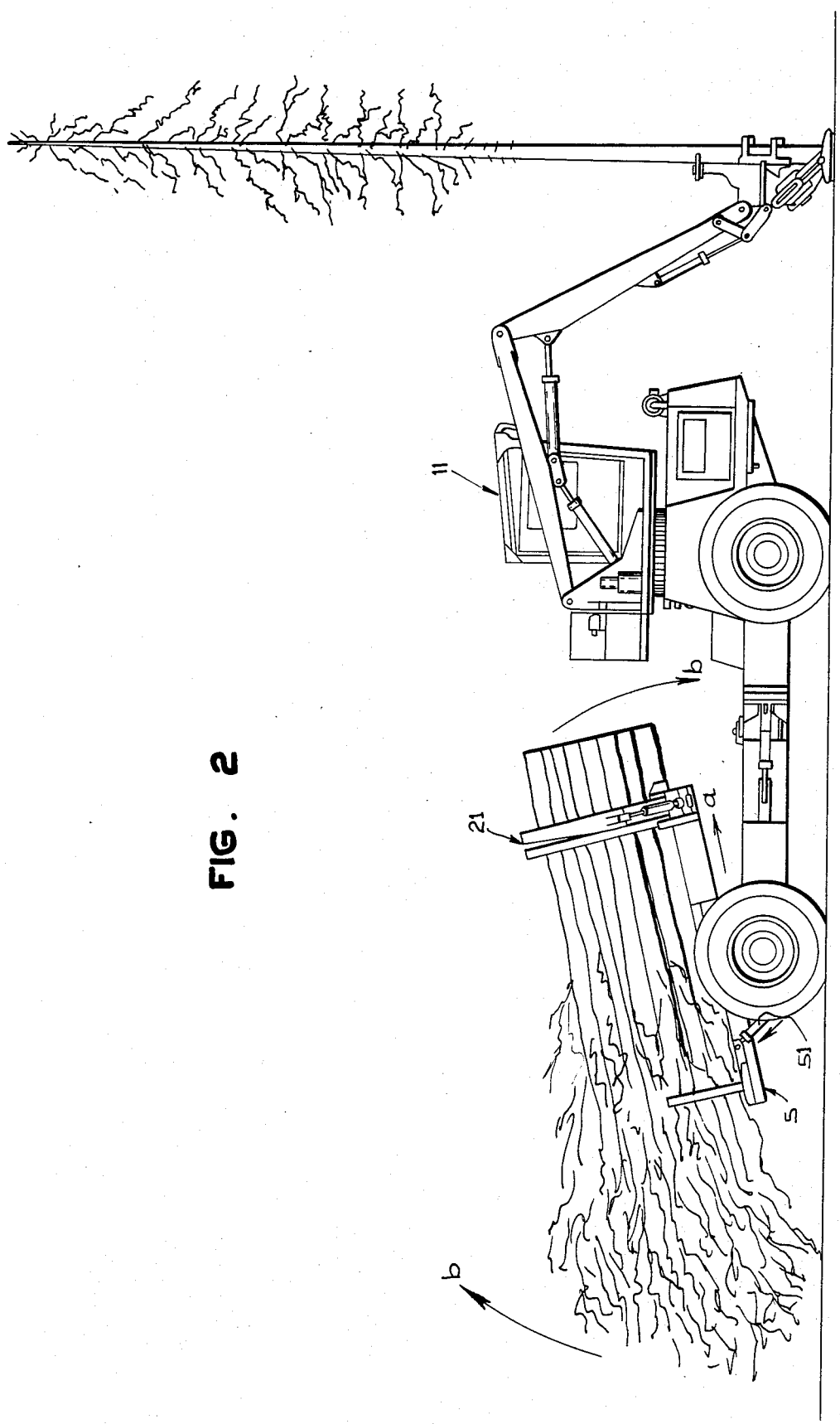

In operation, and as explained above, trees are severed from the ground and are moved by the broken boom 7 rearwardly and laid lengthwise in the berth 5, as illustrated in FIG. 1 where the grapple means, of conventional construction, is in retracted position with respect to the berth means 5 per se. Once enough trees have accumulated in the berth means 5, as shown in FIG. 2, then the grapple means 21 is closed tightly around the trees and moved forwardly along arrow a into the retracted position which is that of FIG. 2. Then, the berth means 5 is pivoted clockwise as shown by arrow b of FIG. 2 until the load reaches the frontwardly inclined position illustrated in FIG. 3.

Thus, when the berth means 5 is being loaded, the grapple means 21 is in retracted position and, as best illustrated in FIG. 1, this allows more room for the handling of the trees by the broken boom 7 since the tree trunk may be loaded further away from the cab 11 then in standard harvesting machines of this type. Thereafter, and as shown in FIG. 2, the whole bunch of trees can be brought closer to the cab 11 by being displaced forwardly whereby to take up any available space left, during loading, between the forward end of the tree trunks and the cab 11. Thus, the length of the vehicle frame 1 can be reduced by the same distance.

Figure 3:
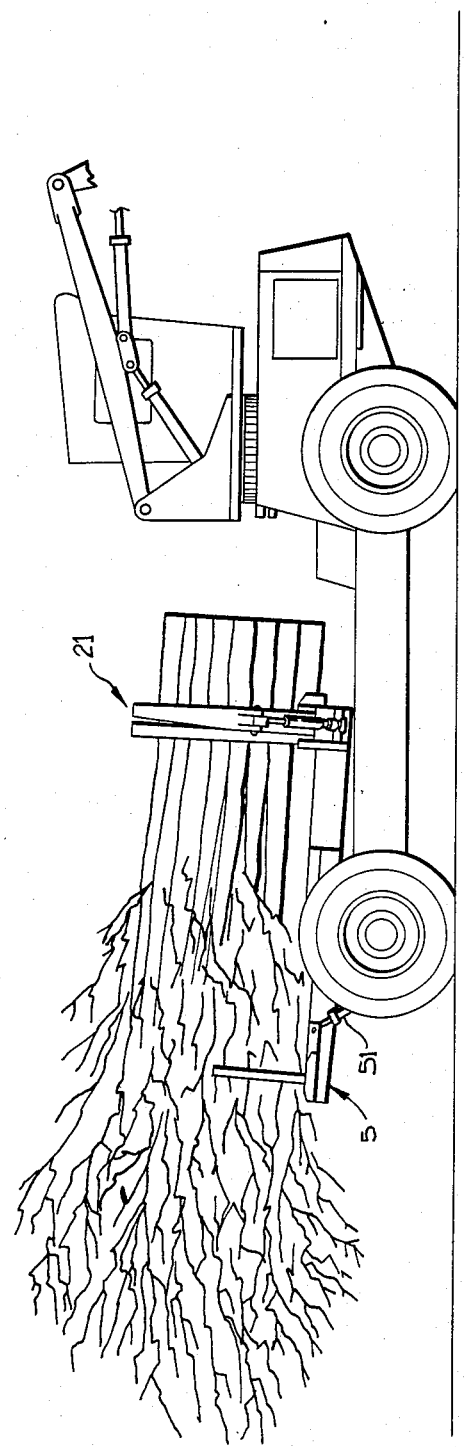

Apart from this saving in frame length, the shifting forward of the center of gravity of the tree load considerably eases the clockwise swinging of the berth means 5 as will readily be apparent from FIGS. 2 and 3.

FIGS. 4, 5 and 6 provide a clear illustration of one preferred embodiment of the improved berth means 5.

The latter comprises a berth section 23, of generally T-shaped configuration, made up of a transverse bar 25 and a longitudinal bar 27, the latter having one end secured to the transverse bar 25 and the other end secured to a pivot box 29. Preferably, both bars 25 and 27 of the berth section 23 are inverted channel members. The pivot box 29 is a rectangular tube defining an inner channel 31 into which the longitudinal bar 27 enters and is secured so that the pivot box 29 and the longitudinal bar 27 define a slide passage 33 to which reference will be made again hereinafter.

The pivot box or block 29 is fixedly secured, as by welding, on an inverted U-shaped support 35 which, itself, is mounted on the frame 1 through a shaft 37 so that the support 35 and its pivot block 29 are mounted on the frame 1 for pivotal movement about the longitudinal axis of the shaft 37.

Slidable inside the aforementioned slide passage 33 is a beam 39, preferably hollow, which has a forward end secured to a head 41 of the uprighted or inverted grapple of the grapple means 21, the said grapple being mounted on the head 41 for oscillation about a vertical axis, as is well known. As known also, the grapple of the grapple means 21 has a pair of tree gripping arms 43 provided with the usual tightening cables 45, both being movable laterally of the frame 1 and are suitable to grip and tightly hold accumulated felled trees together when mechanically closing in around them.

A power means in the form of a hydraulically operated power jack 47 interconnect the berth section 23 and the beam 29 by having its cylinder secured at the free end to the berth section 23, beneath the longitudinal bar 27 and the free end of its rod secured to an upright plate 49 fixed to and inside the hollow beam 39. This upright plate 49 may of course be a cover plate closing the relevant end of the beam 39.

A further power means in the form of a power jack 51 interconnects the berth section 23 and the frame 1, having its cylinder articulated at the free end to the frame 1 and its piston rod articulated at the free end to the berth section 23, beneath the longitudinal bar 27.

As will be gathered from the above description, expansion of the power jack 47 will displace the beam 39 slidably through the pivot box 29 and thus move the grapple means 21 away from the berth section 23. Reverse motion of the piston rod of the power jack 47 will of course draw the grapple means 21 closer to the berth section 23. These two movements of course correspond to the shifting forwardly of the tree load along the arrow a, as illustrated in FIG. 2.

On the other hand, extension of the power jack 51 will swing the berth section 23 clockwise in accordance with arrows b shown in FIG. 2 whereby to bring the load in the forwardly tilting position of FIG. 3.

In this embodiment, the pivot block 29 is secured to the forward end of the berth section 23, the grapple means 21, integrally connected to the sliding beam 39, being provided forwardly of the pivot block 29.

As shown in FIGS. 1, 2 and 3, the power jack 51 is located rearwardly of the rear wheel axle of the vehicle.

Short upright posts 53 are provided at the ends of the transverse bar 25 to retain the tree trunks accumulated in the berth section 23.

As indicated, the foregoing description is only that of a preferred embodiment, the invention being set forth in the appended claims.

A search was made prior to the preparation of the present application and the following U.S. and Canada patents were found:

U.S. Pat. Nos. 3,491,810 of 1970; 3,601,169 of 1971; 3,631,905 of 1972; 3,659,635 of 1972; 3,708,000 of 1973; 3,797,541 of 1974; 4,127,152 of 1978; 4,147,194 of 1979.

Canada Pat. Nos. 386,263 of 1940; 839,075 of 1970; 871,532 of 1971; 888,564 of 1971; 1,083,537 of 1980.

While some of these patents do reveal tilting berths as described above, none include the main feature of the present invention which renders the grapple means 21 slidably displaceable with respect to the berth section 23 for the purpose intended.

We claim:

1. A tree harvesting machine of the type having a wheel-mounted frame, a tree harvesting mechanism at the front end of said frame and berth means on said frame behind said harvesting mechanism for holding accumulated trees felled by said harvesting mechanism, lengthwise of said frame, the improvement wherein said berth means comprises:
    a berth section and means mounting said berth section on said frame for pivotal movement about an axis transverse to said frame;
    grapple means forwardly of said berth section, said grapple having a pair of gripping arms movable laterally of said frame and suitable to grip and tightly hold said accumulated felled trees together;
    means interconnecting said grapple means and said berth section for slidable displacement of said grapple means with respect to said berth section and lengthwise of said frame between a position wherein said grapple means is close to said berth section and a position wherein said grapple means is away from said berth section, and
    first power means interconnecting said berth section and said frame and suitable to pivot said berth section and grapple means about said transverse pivot axis.

2. A machine as claimed in claim 1, wherein said berth section extends rearwardly of said pivot axis and said grapple means is provided forwardly of said pivot axis.

3. A machine as claimed in claim 1, wherein said berth section mounting and pivot means comprises a pivot block secured to the forward end of said berth section, said grapple means being provided forwardly of said pivot block.

4. A machine as claimed in claim 3, wherein said pivot block defines an open-ended passage extending lengthwise of said frame and wherein said means interconnecting said grapple means and said berth section comprises:
    a beam slidably extending through said passage of said pivot block;
    means securing one end of said beam to said grapple means;
    second power means interconnecting said berth section and the other end of said beam and suitable to slidably displace said beam and thus said grapple means between said two positions of said grapple means.

5. A machine as claimed in claim 1, comprising a pair of rear wheels mounted on an axle transverse to said frame and said first power means is located rearwardly of said transverse axle.

6. A machine as claimed in claim 4, comprising a pair of rear wheels mounted on an axle transverse to said frame and said first power means is located rearwardly of said transverse axle.

7. A machine as claimed in claim 4, comprising a pair of rear wheels mounted on an axle transverse to said frame, said first power means being located rearwardly of said transverse axle and being a power jack having a cylinder and a piston rod of which the ends are articulated respectively to said berth section and to said frame.

8. A machine as claimed in claim 4, wherein said second power means is a power jack having a cylinder and a rod of which the ends are fixed respectively to said berth section and to the other end of said beam.

9. A machine as claimed in claim 7, wherein said second power means is a power jack having a cylinder and a rod of which the ends are fixed respectively to said berth section and to the other end of said beam.

* * * * *